(12) United States Patent
Takahashi et al.

(10) Patent No.: US 7,492,516 B2
(45) Date of Patent: Feb. 17, 2009

(54) OPTICAL ELEMENT, POLARIZING ELEMENT, LIGHTING DEVICE, AND LIQUID CRYSTAL DISPLAY

(75) Inventors: Naoki Takahashi, Ibaraki (JP); Kentarou Takeda, Ibaraki (JP); Kazutaka Hara, Ibaraki (JP); Miki Shiraogawa, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 268 days.

(21) Appl. No.: 10/551,140

(22) PCT Filed: Mar. 19, 2004

(86) PCT No.: PCT/JP2004/003716

§ 371 (c)(1),
(2), (4) Date: Sep. 29, 2005

(87) PCT Pub. No.: WO2004/090590

PCT Pub. Date: Oct. 21, 2004

(65) Prior Publication Data

US 2006/0262401 A1    Nov. 23, 2006

(30) Foreign Application Priority Data

Apr. 1, 2003    (JP)    ............................. 2003-097868
Oct. 24, 2003    (JP)    ............................. 2003-364304

(51) Int. Cl.
G02B 5/30    (2006.01)
G02B 27/28    (2006.01)
G02F 1/1335    (2006.01)

(52) U.S. Cl. ...................... 359/494; 359/497; 359/500; 349/96; 349/98; 349/118; 362/19

(58) Field of Classification Search ................. 359/487, 359/494, 497, 500; 349/96, 98, 117, 118; 362/19
See application file for complete search history.

(56) References Cited

U.S. PATENT DOCUMENTS 5,333,072 A * 7/1994 Willett ........................... 349/6
5,574,593 A * 11/1996 Wakita et al. ............... 359/259

(Continued)

FOREIGN PATENT DOCUMENTS

DE    38 36 955    5/1990

(Continued)

OTHER PUBLICATIONS

International Preliminary Report on Patentability of corresponding International application No. PCT/JP2004/003716 mailed Mar. 9, 2006.

*Primary Examiner*—Ricky D Shafer
(74) *Attorney, Agent, or Firm*—Westerman, Hattori, Daniels & Adrian, LLP.

(57) ABSTRACT

An optical element of the invention comprises at least two laminated layers of reflective polarizer; and at least one retardation layer for changing polarization properties laminated between the reflective polarizers, the combination of the layers being designed so as to provide a incident-light transmittance depending on an incident angle of an incident light and designed such that a shielded light is not absorbed but reflected. The optical element can effectively shield transmitted lights with respect to obliquely incident lights and can control coloring.

16 Claims, 6 Drawing Sheets

U.S. PATENT DOCUMENTS

| | | | |
|---|---|---|---|
| 5,928,801 A * | 7/1999 | Broer et al. | 428/690 |
| 6,654,081 B2 * | 11/2003 | Kawamoto et al. | 349/96 |
| 6,922,222 B2 * | 7/2005 | Miyachi et al. | 349/118 |
| 6,975,455 B1 * | 12/2005 | Kotchick et al. | 359/487 |
| 7,245,431 B2 * | 7/2007 | Watson et al. | 359/501 |
| 7,317,498 B2 * | 1/2008 | Hara et al. | 349/62 |

FOREIGN PATENT DOCUMENTS

| | | |
|---|---|---|
| JP | 2-158289 | 6/1990 |
| JP | 6-235900 | 8/1994 |
| JP | 10-54909 | 2/1998 |
| JP | 10-321025 | 12/1998 |
| JP | 2000-235181 | 8/2000 |

* cited by examiner

OPTICAL ELEMENT, POLARIZING ELEMENT, LIGHTING DEVICE, AND LIQUID CRYSTAL DISPLAY

TECHNICAL FIELD

The invention relates to an optical element using a reflective polarizer. The invention also relates to a polarizing element, a lighting device and a liquid crystal display each using the optical element. The optical element of the invention can use diffused light from a light source at high efficiency and can form high-brightness polarized light sources and high-visibility liquid crystal displays.

BACKGROUND ART

Conventionally, for improvement in visibility, liquid crystal displays or the like generally use techniques for condensing emitted light into the front direction and enhancing brightness with a surface-shaped, condensing element such as a prism sheet and a lens array sheet so that the light emitted from light sources can efficiently enter the liquid crystal displays or the like.

Because of the mechanism, however, such a surface-shaped, condensing element needs a large difference in refractive index for condensation of light and thus needs to be placed through an air layer. Thus, the condensing element has problems of an increased number of components, optical loss due to unnecessary scattering, and visible surface defect and visible contamination of setting gap with foreign matter.

It is proposed that for improvement in the visibility of liquid crystal displays or the like, techniques for increasing the emission brightness of polarized light should include a lighting system comprising a reflective layer provided on the underside of a light guide plate and a reflective polarizer provided on the emission side for the purpose of allowing light from the light source to efficiently enter the liquid crystal displays or the like. The reflective polarizer has the function of separating the components of incident natural light into transmitted polarized light and reflected polarized light depending on polarization state. The reflective polarizer is broadly classified into a linear polarization type reflective polarizer for separating linearly polarized light and a circular polarization type reflective polarizer for separating circularly polarized light.

There is proposed an optical element comprising reflective polarizers and an element (a retardation layer) for changing polarization state sandwiched between the reflective polarizers. Linear polarization type reflective polarizers use Brewster angle to separate polarized light, and those using a vapor-deposited bandpass filter are known (for example, see German Patent Application Laid-Open No. 3836955). Circular polarization type reflective polarizers use Bragg reflection, and for example, those using the selective reflection properties of cholesteric liquid crystals are known (for example, see Japanese Patent Application Laid-Open (JP-A) No. 02-158289, JP-A No. 06-235900, and JP-A No. 10-321025).

Optical devices using the reflective polarizer have an angle-dependency with respect to the transmittance and the reflectance and can condense diffused light into the front direction. In addition, the reflectance of these reflective polarizing elements varies with incident angle, and thus if they are appropriately optically designed, they can transmit light only in the front direction. On the other hand, the non-transmitted light is reflected and allowed to return toward the light source without being absorbed so that it can be recycled to achieve efficient condensing properties. In the collimating system using the reflective polarizer, the degree of parallelization can be designed to be high, and lights can be condensed and collimated into a narrow range of at most ±20 degrees from the front direction. It is difficult to achieve such a level in a conventional simple backlight system using a prism sheet or a microdot array.

In such optical elements (collimating films), however, the shielding rate is not satisfactory, and residual transmitted lights are observed with respect to obliquely incident lights. If the width of the wavelength band to be shielded is narrow, secondary transmission can occur in oblique directions, which can lead to release and waste in oblique directions and can lead to variations in transmittance depending on wavelength so that a problem of coloring or the like can be caused in some cases.

DISCLOSURE OF INVENTION

It is an object of the invention to provide an optical element capable of effectively shielding transmitted lights with respect to obliquely incident lights and capable of controlling coloring.

It is another object of the invention to provide a polarizer, a lighting device and a liquid crystal display each using the optical element.

The inventors have made active investigations to solve the above problems and finally have found an optical element as described below in completing the invention. Thus, the invention comprises at least two laminated layers of at least one kind of reflective polarizer; and at least one layer of at least one kind of retardation layer (b) for changing polarization properties laminated between the reflective polarizers, the combination of the layers being designed so as to provide a incident-light transmittance depending on an incident angle of an incident light and designed such that a shielded light is not absorbed but reflected, wherein at least one layer of the reflective polarizer is a circular polarization type reflective polarizer (a1) capable of transmitting a certain circularly polarized light and selectively reflecting an oppositely circularly polarized light; at least one layer of the reflective polarizer is a linear polarization type reflective polarizer (a2) capable of transmitting one of perpendicular linearly polarized lights and selectively reflecting the other of the perpendicular linearly polarized lights; and the retardation layer (b) is a layer (b1) having a front (in the normal direction) retardation value of about λ/4 and having a retardation value of at least λ/8 with respect to an incident light inclined by at least 30° to the normal direction.

The invention further comprises an aspect, wherein the retardation layer (b1) is a biaxial retardation layer having a front (in the normal direction) retardation value of about λ/4 and an Nz coefficient of at least 2.0, wherein the Nz coefficient is defined by the formula: $(n_x-n_z)/(n_x-n_y)$, where $n_x$ and $n_y$ are each principal in-plane refractive indices, and $n_z$ is a principal refractive index in the thickness direction; and the biaxial retardation layer has a slow axis whose direction is set to make an angle of 45°±5° (or −45°±5°) with a polarization axis of the linear polarization type reflective polarizer (a2).

The invention further comprises an aspect, wherein the retardation layer (b1) is a biaxial retardation layer having a front (in the normal direction) retardation value of about λ/4 and an Nz coefficient of at most −1.0, wherein the Nz coefficient is defined by the formula: $(n_x-n_z)/(n_x-n_y)$, where $n_x$ and $n_y$ are each principal in-plane refractive indices, and $n_z$ is a principal refractive index in the thickness direction; and the biaxial retardation layer has a slow axis whose direction is set to make an angle of 45°±5° (or −45°±5°) with a polarization axis of the linear polarization type reflective polarizer (a2).

The invention further comprises an aspect, wherein the retardation layer (b1) is a stretched film comprising at least one material selected from polycarbonate, polysulfone, polyethylene, polypropylene, polyvinyl alcohol, cycloolefin polymers, and norbornene polymers.

The invention further comprises an aspect, wherein the retardation layer (b1) is an oriented film comprising at least one material selected from polyamide, polyimide, polyester, polyetherketone, polyamideimide, and polyesterimide.

The invention further comprises an aspect, wherein the retardation layer (b1) is a composite of a layer (b11) having a front (in the normal direction) retardation value of about zero and having a retardation value of at least λ/8 with respect to an incident light inclined by at least 30° to the normal direction; and a uniaxial retardation layer (b12) having a front (in the normal direction) retardation value of about λ/4 and an Nz coefficient of 1.0, wherein the Nz coefficient is defined by the formula: (nx−nz)/(nx−ny), where nx and ny are each principal in-plane refractive indices, and nz is a principal refractive index in the thickness direction, and the uniaxial retardation layer (b12) has a slow axis whose direction is set to make an angle of 45°±5° (or −45°±5°) with a polarization axis of the linear polarization type reflective polarizer (a2).

The invention further comprises an aspect, wherein the layer (b11) having the retardation value has a fixed planar orientation of a cholesteric liquid crystal phase having a reflection wavelength band outside a visible light range.

The invention further comprises an aspect, where the uniaxial retardation layer (b12) is a stretched film comprising at least one material selected from polycarbonate, polysulfone, polyethylene, polypropylene, polyvinyl alcohol, cycloolefin polymers, and norbornene polymers.

The invention further comprises an aspect, wherein the circular polarization type reflective polarizer (a1) comprises a cholesteric liquid crystal material.

The invention further comprises an aspect, wherein the linear polarization type reflective polarizer (a2) is a grid polarizer.

The invention further comprises an aspect, wherein the linear polarization type reflective polarizer (a2) is a multilayer thin film laminate comprising at least two layers of at least two materials different in refractive index.

The invention further comprises an aspect, wherein the multilayer thin film laminate is a vapor-deposited multilayer thin film.

The invention further comprises an aspect, wherein the linear polarization type reflective polarizer (a2) is a multilayer thin film laminate comprising at least two layers of at least two birefringent materials.

The invention further comprises an aspect, wherein the multilayer thin film laminate is a stretched resin laminate comprising at least two layers of at least two birefringent resins.

Further, the invention includes a polarizing element, with the above mentioned optical element and a dichroic linear polarizer adhered on the outside of the linear polarization type reflective polarizer (a2) of the optical element.

Further, the invention includes a polarizing element, with the above mentioned optical element and a quarter wavelength plate and a dichroic linear polarizer which are adhered on the outside of the circular polarization type reflective polarizer (a1) of the optical element.

Additionally, the invention includes the above-mentioned polarizing element, wherein the quarter wavelength plate has an Nz coefficient of from −2.0 to −1.0, wherein the Nz coefficient is defined by the formula: (nx−nz)/(nx−ny), where nx and ny are each principal in-plane refractive indices, and nz is a principal refractive index in the thickness direction.

Additionally, the invention includes a lighting device, comprising a surface light source; a reflective layer provided on the back side of the surface light source; and the above mentioned optical element or the above mentioned polarizing element provided on the front side of the surface light source.

Additionally, the invention includes a liquid crystal display, comprising the above mentioned lighting device and a liquid crystal cell provided on a light-emitting side of the lighting device.

Additionally, the invention includes a wide viewing angle liquid crystal display, comprising the above mentioned liquid crystal display and a wide viewing angle film that is placed on the view side with respect to the liquid crystal cell in order to diffuse light passing through the liquid crystal cell to the view side.

Additionally, the invention includes the above mentioned wide viewing angle liquid crystal display, wherein the wide viewing angle film comprises a diffusing layer exhibiting substantially no back scattering or depolarization.

EFFECT OF THE INVENTION

Referring to FIGS. 5 and 6, a description will be given below of an ideal model of the mechanism of the simultaneous achievement of condensation and brightness enhancement in the optical element comprising a polarization state-changing element (retardation layer) sandwiched between reflective polarizers.

Natural light emitted from a light source is separated by a first reflective polarizer (a1) into transmitted polarized light and reflected polarized light. The transmitted polarized light in and near the normal direction can pass through a second reflective polarizer (a1) as it is, because the retardation layer (b11) provided has a front (in the normal direction) retardation of about zero while having a retardation of at least λ/8 with respect to incident light inclined by at least 30° to the normal direction. At angles inclined to the normal direction, the polarization state is changed by the retardation effect so that the increased polarized light components are reflected by the second reflective polarizer (a1). Particularly when the retardation is approximately λ/2, the lights are effectively reflected. The reflected polarized lights are retarded again to have a changed polarization state in such a manner that they can pass through the first reflective polarizer (a1) and thus allowed to return to the light source unit through the first reflective polarizer. The reflected lights from the first and second reflective polarizers (a1) is depolarized by a reflective diffusing plate or the like placed under the light source, and the direction of the reflected lights is also changed by the reflective diffusing plate or the like. Part of the returning lights undergo repeated reflection until they become polarized lights in and near the normal direction, which can pass through the reflective polarizer, and thus they can contribute to an enhancement in brightness.

When a circular polarization type reflective polarizer (a1) is used as the reflective polarizer, the retardation layer may be a layer (b11, hereinafter also referred to as C-plate) having a front (in the normal direction) retardation of about zero and having a retardation value of at least λ/8 with respect to incident light inclined by at least 30° to the normal direction, which can produce polarization conversion regardless of the azimuth angle. When the C-plate has a retardation of approximately λ/2 with respect to obliquely incident light, the incident light is just converted into oppositely circularly polarized light.

When a linear polarization type reflective polarizer (a2) is used as the reflective polarizer (a), and a C-plate is used alone as the retardation layer (b), the optical axis with respect to incident lights in directions inclined to the C-plate can be always perpendicular to the light direction so that the retardation effect is not produced and that polarization conversion is not provided.

The optical element (a collimating film) using two pieces of such reflective polarizers (a) can form a collimating backlight, which can be thin and easily provide a highly parallel light source as compared with conventional techniques. In addition, lights can be collimated by reflection and polarization substantially without absorption loss. The reflected non-collimated components of the light are allowed to return to the backlight side and undergo cycles of scattering and reflection and selection of only collimated components of the light so that substantially high transmission rate and high light-use efficiency can be achieved.

The above optical element (the collimating film) uses either the circular polarization type (a1) or linear polarization type (a2) reflective polarizer and thus the same type of reflective polarizers (a). In the case that the circular polarization type reflective polarizers (a1) are used, however, the polarization state can be significantly changed in the directions inclined to the normal direction of the first reflective polarizer (a1), and thus the degree of polarization can be reduced. In this case, lights collimated from directions highly inclined (by at least 60°) to the normal direction of the light source are significantly colored. In the case that the linear polarization type reflective polarizers (a2) are used, the polarization state in the oblique directions remains very good, but the viewing angle-dependent anisotropy in the axial direction can be high, because the retardation layer with a certain front retardation is placed at 45° with respect to the polarization axis. Accordingly, high-collimating angles and low-collimating angles can be present at the same time in the viewing angles.

According to the invention, therefore, there is developed an optical element, comprising: reflective polarizers (a) including at least one piece of the circular polarization type reflective polarizer (a1) and at least one piece of the linear polarization type reflective polarizer (a2); and a layer (b1) that is placed between the different types of reflective polarizers and has a front (in the normal direction) retardation of about λ/4 and a retardation value of at least λ/8 with respect to incident light inclined by at least 30° to the normal direction. This optical element can effectively shield transmission of light with respect to obliquely incident lights, can have good brightness properties, and can further control coloring.

Figure 1:
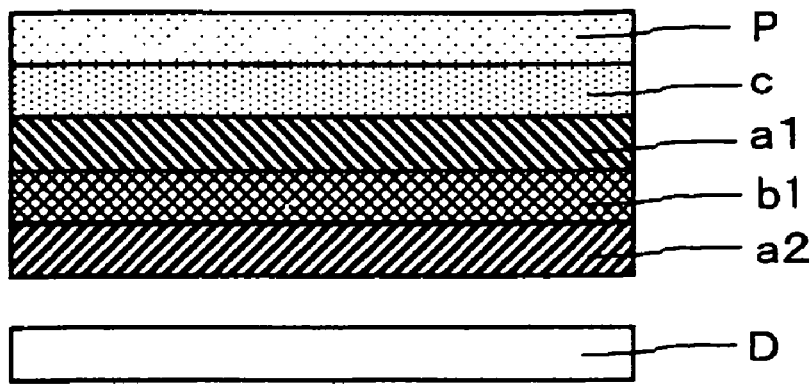
FIG. 1 is a cross-sectional view showing part of a liquid crystal display according to the invention.

In the drawings, reference letter a1 represents a circular polarization type reflective polarizer, a2 a linear polarization type reflective polarizer, b (b1, b11, b12) a retardation layer, c a quarter wavelength plate, P a polarizing plate, and D a backlight, respectively.

BEST MODE FOR CARRYING OUT THE INVENTION

Figure 2:
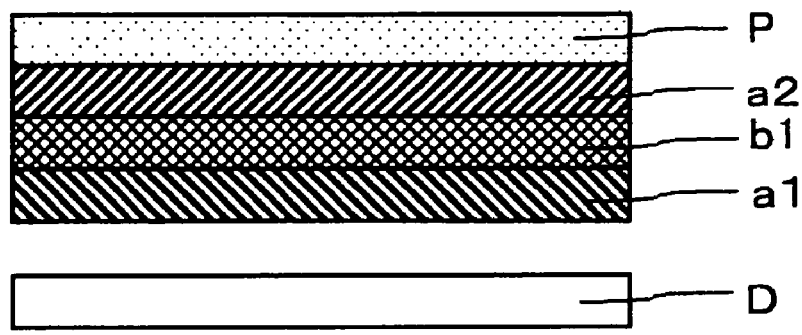
FIG. 2 is a cross-sectional view showing part of a liquid crystal display according to the invention.

Referring to the drawings, the invention will be described below. FIGS. 1 and 2 are cross-sectional views each showing an optical element comprising a circular polarization type reflective polarizer (a1), a linear polarization type reflective polarizer (a2), and a layer (b1) that is placed between the polarizers (a1) and (a2) and has, in a visible light wavelength range, a front (in the normal direction) retardation of about λ/4 and a retardation value of at least λ/8 with respect to incident light inclined by at least 30° to the normal direction.

(Reflective Polarizer (a))

The reflective polarizers for use include at least one piece of a circular polarization type reflective polarizer (a1) and at least one piece of a linear polarization type reflective polarizer (a2), which have selective reflection wavelength bands overlapping each other for polarization. For enhancement in brightness, the wavelength bands preferably overlap such that high-visibility light at and near a wavelength of 550 nm can be reflected and thus preferably overlap at least in the wavelength region of 550 nm ±10 nm. In view of coloring and RGB configuration in liquid crystal displays or the like, the reflection wavelength bands more preferably overlap in the entire visible light wavelength range of 380 nm to 780 nm. In these viewpoints, the bands of the combined reflective polarizers may be entirely the same, or one may reflect light over the entire visible range while another may reflect light in part of the visible rage.

(Circular Polarization Type Reflection Polarizer (a1))

For example, a cholesteric liquid crystal material is used in a circular polarization type reflection polarizer (a1). In the reflection polarizer (a1), a central wavelength in selective reflection is determined by a formula λ=np (wherein n indicates a refractive index of a cholesteric material and p indicates a chiral pitch). For obliquely incident light, the superimposed wavelength region is preferably wider since a selective reflection wavelength is subjected to a blue shift.

In the present invention, a proper cholesteric liquid crystal may be used as a cholesteric liquid crystal constituting a circular polarization type reflection polarizer (a1) without imposing any specific limitation. Examples thereof that are named include: a liquid crystal polymer exhibiting a cholesteric liquid crystallinity at a high temperature; a polymerized liquid crystal obtained by polymerizing a liquid crystal monomer, and a chiral agent and an alignment agent, when both are required, with illumination of ionizing radiation such as an electron beam, ultraviolet or the like, or with heating; and a mixture thereof. While a liquid crystallinity may be either lyotropic or thermotropic, a thermotropic liquid crystal is desirable from the view point of ease of control and formability of monodomain.

Formation of a cholesteric liquid crystal layer can be performed by means of a method in conformity with a conventional alignment treatment. Exemplified are: a method in which a liquid crystal polymer is developed on a proper alignment film selected from the group: an alignment film obtained by being subjected to a rubbing treatment with a rayon cloth or the like on a film made of polyimide, polyvinyl alcohol, polyester, polyarylate, polyamide imide, polyether imide or the like formed on a support base material having as low a birefringence retardation as possible such as triacetyl cellulose, amorphous polyolefin or the like; an alignment film made of an obliquely evaporated layer made of SiO; on an alignment film made by stretching and others, the liquid crystal polymer is heated at a temperature of a glass transition temperature or higher and lower than an isotropic phase transition temperature and cooled at a temperature lower than the glass transition temperature in a planar alignment state of the liquid crystal polymer molecules into a glassy state to thereby form a fixed layer in which the alignment is fixed; and other methods.

Film formation of a liquid crystal polymer can be performed by means of a method in which a liquid crystal polymer is developed into a thin film using a solution of the liquid crystal polymer with a solvent with one of the following techniques: such as a spin coating method; a roll coating method, a flow coating method; a printing method; a dip coating method; a flow film forming method; a bar coating method; a gravure printing method and others, to further dry the thin film, when required. Examples of the solvent that can be properly used selectively include: methylene chloride, cyclohexanone, trichloroethylene, tetrachloroethane, N-methylpyrrolidone, tetrahydrofuran and others.

One of methods can be adopted in which a heat-melt of a liquid crystal polymer and preferably a heat-melt in a state exhibiting an isotropic phase is developed in a procedure in conformity with a procedure as described above, the developed film is further developed to a thinner film while a melting temperature is maintained, if necessary, and the thinner film is then solidified. The one method is a method using no solvent; therefore, a liquid crystal polymer can be developed by a method good in hygiene in a working environment as well. Note that in development of a liquid crystal polymer, there can be adopted a superimposition scheme for cholesteric liquid crystal layers with alignment films interposed between layers for the purpose to realize a thinner, if necessary.

One of the optical layers can also be separated from a support base material/an alignment base material therefore used in film formation and transferred onto another optical material for use when required.

(Linear Polarization Type Reflection Polarizer (a2))

Examples of the liner polarization type reflection polarizer (a2) include: a grid type polarizer; a multilayer thin film laminate with two or more layers made of two or more kinds of materials having a difference between refractive indices; evaporated multilayer thin film having different refractive indices used in a beam splitter or the like; a multi-birefringence layer thin film laminate with two or more layers made of two or more kinds of materials each having birefringence; a stretched resin laminate with two or more layers using two or more kinds of resins each having a birefringence; a polarizer separating linearly polarized light by reflecting/transmitting linearly polarized light in the axis directions perpendicular to each other; and others.

A uniaxially stretched multilayer laminate can be used that is obtained by uniaxially stretching a multilayer laminate obtained by alternately laminating materials generating a retardation by stretching represented by PEN, PET and PC; and resins each generating a low retardation, such as an acrylic resin represented by PMMA; and a norbornene resin and others represented by ARTON manufactured by JSR Corp.

(Retardation Layer (b1))

In a visible light range, the retardation layer (b1) has a front (in the normal direction) retardation value of about $\lambda/4$ and a retardation value of at least $\lambda/8$ with respect to incident light inclined by at least 30° to the normal direction. In general, the front retardation is preferably in the range of approximately $\lambda/4\pm40$ nm, more preferably of $\lambda/4\pm15$ nm, with respect to light with a wavelength of 550 nm. The retardation layer may be placed such that the slow axis of the retardation layer (b1) makes an angle of $45°\pm5°$ (or $-45°\pm5°$) with the polarization axis of the linear polarization type reflective polarizer (a2).

The front retardation is set for the purpose of converting vertically incident polarized light from linearly polarized light to circularly polarized light or converting circularly polarized light into linearly polarized light and thus should be set at approximately $\lambda/4$, preferably at approximately $\lambda/4$ in the entire visible region.

Retardation relative to incident light in an oblique direction is properly determined according to an angle at which total reflection is effected for efficient polarization conversion. In order to perfectly realize total reflection at an angle of the order of 60° inclined from the normal direction, it is only required to determine a retardation so as to be a value of the order of $\lambda/2$ when measured at 60°. Since transmitted light through the reflection polarizer (a1) changes a polarization state thereof by a birefringence like a C plate of the circular polarization type reflection polarizer (a1) itself as well, a retardation when measured at the angle of the C plate that is usually inserted may be a value less than $\lambda/2$. Since a retardation of the C plate increases monotonously with increase in inclination of incident light, a retardation has only to be $\lambda/4$ or more relative to incident light at an angle of 30° as a target value for effectively causing total reflection at inclination at an angle of 30° or more.

A single retardation layer (b1) may be provided, or two or more retardation layers (b1) may be combined. For example, the single retardation layer (b1) may be a biaxial retardation layer having a front (in the normal direction) retardation of about $\lambda/4$ and an Nz coefficient of at least 2.0 or at most −1.0. The slow axis of the biaxial retardation layer may be placed so as to make an angle of $45°\pm5°$ (or $-45°\pm5°$) with the polarization axis of the linear polarization type reflective polarizer (a2).

Figure 3:
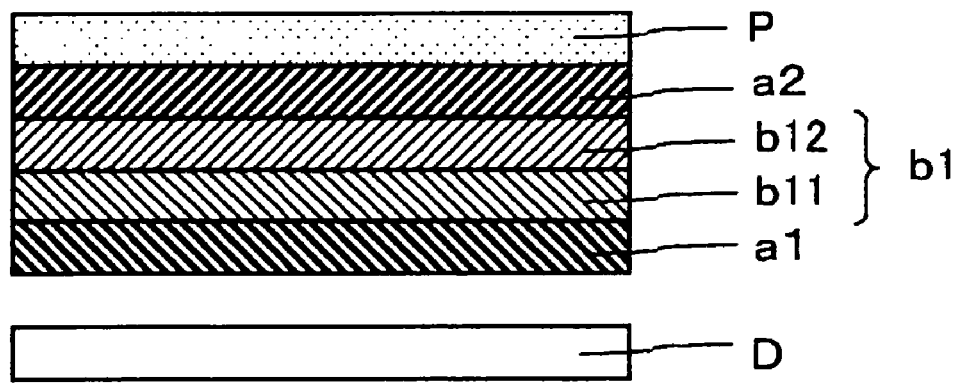
FIG. 3 is a cross-sectional view showing part of yet a liquid crystal display according to the invention.
Figure 4:
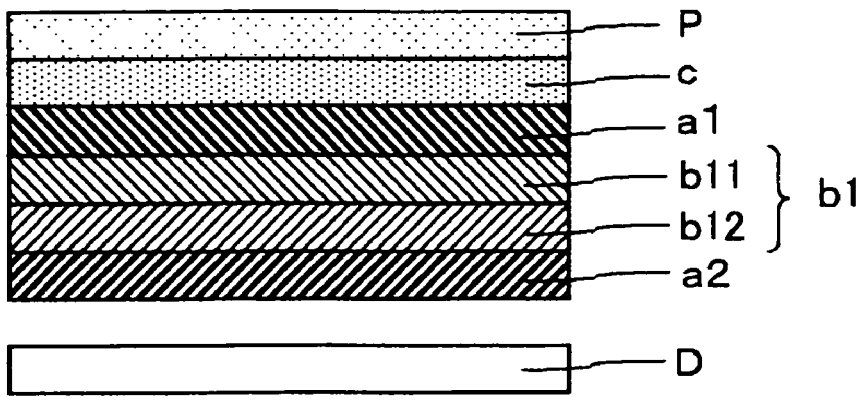
FIG. 4 is a cross-sectional view showing part of a liquid crystal display according to the invention.

Referring to FIGS. 3 and 4, the two-layer retardation layer (b1) may be a composite of: a layer (b11) having a front (in the normal direction) retardation of about zero and having a retardation value of at least $\lambda/8$ with respect to incident light inclined by at least 30° to the normal direction; and a uniaxial retardation layer (b12) having a front (in the normal direction) retardation of about $\lambda/4$ and an Nz coefficient of 1.0. When two or more layers are used, one piece of the uniaxial retardation layer (b12) may be used in combination with one or more pieces of a C-plate (b11) having a retardation of about zero in the front direction and producing a retardation effect in directions inclined to the normal direction. The front retardation is set for the purpose of maintaining vertically incident polarized light and thus should preferably be λ/10 or less.

The slow axis of the uniaxial retardation layer (b12) may be placed so as to make an angle of 45°±5° (or −45°±5°) with the polarization axis of the linear polarization type reflective polarizer (a2). When the retardation layer (b1) is a composite of the layer (b11) and the uniaxial retardation layer (b12), the layer (b11) is preferably placed on the circular polarization type reflective polarizer (a1) side as shown in FIGS. 3 and 4.

Any material having the above optical properties may be used to form the retardation layer (b1). For example, any birefringent plastic material may be stretched and used to form the biaxial retardation layer for the monolayer retardation layer (b1) or to form the uniaxial retardation layer (b12) for the two-layer retardation layer (b1). In a visible light range, such a plastic material should preferably have good transparency and a transmittance of at least 80%. Examples of such a plastic material include polycarbonate, polysulfone, polyarylate, polyethersulfone, polyolefins such as polyethylene and polypropylene, polystyrene, polyvinyl alcohol, cellulose acetate polymers such as triacetyl cellulose and diacetyl cellulose, polyethylene terephthalate, cycloolefin polymers, norbornene polymers and any modified polymers thereof. In particular, polycarbonate, polysulfone, polyethylene, polypropylene, polyvinyl alcohol, cycloolefin polymers, and norbornene polymers are preferably used. Uniaxially homeotropically aligned liquid crystal materials may also be used. Such alignment may be achieved in the same manner as in the method of forming the cholesteric liquid crystal film, except that nematic liquid crystal materials need to be used in place of the cholesteric liquid crystal materials.

Alternatively, the production method as described below may be used to form the biaxial retardation layer with a front (in the normal direction) retardation of about λ/4 and an Nz coefficient of at least 2.0 for the monolayer retardation layer (b1). Conventional materials for retardation layers or conventional production methods with such materials cannot easily produce a difference in birefringence, and thus an increase in film thickness (d) is necessary for an increase in in-plane retardation [(nx−ny)·d]. On the other hand, when a thin film is formed, a relatively high stretch ratio is necessary so that the precision of the retardation value can be reduced. Particularly, the biaxial retardation layer with an Nz coefficient of at least 2.0 for the monolayer retardation layer (b1) needs a film exhibiting the characteristics: nx>ny>nz. In the process of forming such a biaxial retardation layer (b1), its refractive indices, which in two in-plane directions and in the thickness direction, need to be three-dimensionally controlled. In biaxial stretching methods, however, a relatively high stretch ratio is necessary in the x axis direction and in the y axis direction so that the precision of the optical axis and the precision of the in-plane retardation can be significantly reduced due to bowing phenomenon or the like. In order to overcome these problems and make thinner films, the method as described below may be used, which is described in detail in Japanese Patent Application No. 2002-120279.

Specifically, the production method includes the steps of: solidifying a developed layer of a liquefied solid polymer to form a transparent film with an na value of 0.01 to 0.3; and subjecting the transparent film to a treatment in which the molecule is oriented in the surface of the film so that a birefringent film is formed which is characterized by having an Re value of ¼ wavelength or ½ wavelength with respect to visible light, wherein $n\alpha=(nx+ny)/2-nz$ and $Re=(nx-ny)\cdot d$, where nx and ny are each in-plane refractive indices, nz is a refractive index in the thickness direction, and d is the thickness. The birefringent film produced by this method may be used as the biaxial retardation layer with an Nz coefficient of at least 2.0 for forming the monolayer retardation layer (b1).

One or more of any appropriate conventional optically-transparent solid polymers may be used to form the birefringent film. A preferred solid polymer can form a highly transparent film with a light transmittance of at least 75%, particularly of at least 85%. From the standpoint of stable mass production of the transparent film with the na value, solid polymers that can have lower refractive index in the stretching direction and show negative birefringence are preferably used. Such solid polymers are also advantageous for forming a birefringent film having the characteristics of nx>ny>nz.

Examples of the solid polymers showing negative birefringence include polyamide, polyimide, polyester, polyetherketone (particularly polyaryletherketone), polyamideimide, and polyesterimide. One of the solid polymers or a mixture of two or more of the solid polymers may be used to form the birefringent film. The solid polymer may have any molecular weight but preferably a weight average molecular weight of 1,000 to 1,000,000, more preferably of 1,500 to 750,000, particularly preferably of 2,000 to 500,000, generally from the standpoint of processibility into films.

The transparent film serving as a base material for the birefringent film may be formed by a process including the steps of liquefying the solid polymer, developing the liquefied polymer and solidifying the developed layer. In the process of forming the transparent film, various additives such as stabilizers, plasticizers and metals may be added as needed. Any appropriate method may be used to liquefy the solid polymer, for example, including a method of heating and melting a thermoplastic solid polymer and a method of dissolving a solid polymer in a solvent to form a solution.

Thus, the solidification of the developed layer may be achieved by cooling the melted developed layer in the former case or may be achieved by removing and drying off the solvent from the developed solution layer in the latter case. One or more of any appropriate drying methods may be used such as natural drying (air drying), heat drying, particularly heat drying at about 40 to 200° C., or reduced pressure drying. The polymer solution coating method is preferred from the standpoint of production efficiency and control of occurrence of optical anisotropy.

For example, the solvent may comprise one or more of various solvents such as methylene chloride, cyclohexanone, trichloroethylene, tetrachloroethane, N-methylpyrrolidone, and tetrahydrofuran. From the standpoint of suitable viscosity for film formation, preferably 2 to 100 parts by weight, more preferably 5 to 50 parts by weight, particularly preferably 10 to 40 parts by weight of the solid polymer is dissolved in 100 parts by weight of the solvent to form a solution.

The liquefied solid polymer may be developed by any appropriate film-forming method such as a spin coating method, a roll coating method, a flow coating method, a printing method, a dip coating method, a film-forming method by flow casting, a bar coating method, a casting method such as a gravure printing method, and an extrusion method. In particular, a film forming method with a solution such as a casting method is preferred, from the standpoint of mass production of films with less variation in thickness or less alignment distortion. In such a case, a solvent-soluble polyimide prepared from an aromatic dianhydride and poly(aromatic diamine) is preferably used (Japanese Patent Application National Publication (Laid-Open) No. 08-511812).

The characteristics of $0.01 \leq n\alpha \leq 0.3$ may be produced in the process of solidifying a developed layer of a liquefied solid polymer to form a transparent film. Particularly when the solid polymer showing negative birefringence is used, the $n\alpha$ characteristics can be produced by simply solidifying the developed layer of the liquefied polymer.

The $n\alpha$ value controls the $n\alpha \cdot d$ (hereinafter also referred to as "Rz") value of the final birefringent film product. From the standpoint of control of Rz, particularly production of thin films, the na value of the transparent film should preferably be from 0.02 to 0.2. In the above context, d represents a film thickness.

The characteristics that of an Re value of the birefringent film is of ¼ or ½ wavelength with respect to visible light may be produced by subjecting the transparent film to a treatment in which the molecule is aligned in the surface of the film. By this treatment, the solid polymer showing negative birefringence is also allowed to have the characteristics of nx>ny>nz. Specifically, the process of forming the transparent film by developing the liquefied product is performed for the purpose of controlling nz, and the transparent film obtained through the process can generally satisfy nx≈ny and thus have the characteristics of Re≈0 nm. Even with a thickness of 50 μm, therefore, the film can have an Re value of less than 30 nm, particularly of 0 to 10 nm. Re=0 means nx=ny.

In this production method particularly using the solid polymer showing negative birefringence, nz and then Rz can be controlled in the process of forming the transparent film, and nx and ny and then Re can be controlled in the process of aligning the molecule in the surface of the transparent film. This multistage method can achieve the object at a low stretch ratio as compared with a conventional method of simultaneously controlling Rz and Re, such as a biaxial stretching method, and thus has the advantage that birefringent films can easily be produced with a high precision in each of the Re properties and the optical axis and particularly has the advantage that biaxial birefringent films can easily be produced with a high precision in each of the Rz and Re properties and the optical axis based on the characteristics of nx>ny>nz from the solid polymer showing negative birefringence.

The process of aligning the molecule in the surface of the transparent film may be a process of extending and/or shrinking the film. For example, the extending process may be a stretching process or the like. One or more of any appropriate methods such as a sequential or simultaneous biaxial stretching method and a free-end or fixed-end uniaxial stretching method may be used in the stretching process. The uniaxial stretching method is preferred from the standpoint of controlling the bowing phenomenon. The stretching temperature may be according to conventional techniques and is generally near the glass transition temperature of the solid polymer for forming the transparent film, particularly at least the glass transition temperature.

For example, the shrinking process may include the steps of forming the transparent film by coating on a substrate and using a change in size associated with a change in the substrate temperature so as to exert the shrinking force. In this process, a substrate having shrinkability such as a shrinkable film may also be used. In such a case, the shrinkage percentage is preferably controlled using a stretching machine or the like.

The magnitude of Rz or Re of the resulting birefringent film can be controlled by changing the type of the solid polymer, the method of forming the developed layer such as the liquefied product coating method, the method of solidifying the developed layer such as drying conditions, and the thickness of the transparent film to be formed. For thickness reduction, the transparent film should typically have a thickness of 0.5 to 30 μm, preferably of 1 to 25 μm, particularly preferably of 2 to 20 μm.

From the standpoint of reduction in the thickness of the retardation layer (b1), the birefringent film should preferably satisfy the requirements that Re per 1 μm thickness of the film (Re/d) be from 3 to 100 nm, from 5 to 75 μm, or particularly from 10 to 50 μm, where d is the thickness of the film, provided that nx>ny (where nx represents a slow axis). When the solid polymer showing negative birefringence is used, Rz per 1 μm thickness of the birefringent film (Rz/d) should be at least 5 nm, preferably from 10 to 100 nm, particularly preferably from 20 to 70 nm.

Preferably, the method of producing the birefringent film according to the invention includes the steps of: dissolving a solid polymer in a solvent; developing the liquefied solid polymer on a support base material; drying it; and subjecting a transparent film of the solidified product, which satisfies nx=ny or nx≈ny, to either or both of the extending process and the shrinking process so that the molecule is in-plane aligned and that the characteristics of retardation Re at the desired wavelength and optionally the characteristics of nx>ny>nz or Rz are provided. According to this method, the transparent film can be processed while supported on the base material, and high production efficiency and high processing precision can be provided, and continuous production is possible.

Any appropriate support base material may be used. The birefringent film may a transparent film integrated with the support base material or may a transparent film separated from the support base material. In the former case where the support base material is integrated, the retardation effect produced by stretching or the like in the support base material may be used for the retardation effect of the birefringent film. The latter separating method should be advantageous, if an improper retardation effect is produced by stretching or the like in the support base material. In the former case with the integrated support base material, a transparent polymer base material is preferably used for the support base material.

Examples of the material for the polymer base material include those of the solid polymer, acetate polymers, polyethersulfone, polysulfone, polycarbonate, polynorbornene, polyolefin, acrylic polymers, cellulose resins, polyarylate, polystyrene, polyvinyl alcohol, polyvinyl chloride, polyvinylidene chloride, liquid crystal polymers, and thermosetting or ultraviolet-curable resins such as acrylic resins, urethane resins, acrylic urethane resins, epoxy resins, and silicone resins. Highly isotropic materials such as acetate polymers are preferred from the standpoint of controlling the effect of the support base material on the retardation. Any of the above polymers may also be used to form the transparent film.

The retardation layer (b1), that is C plate, are exemplified: a layer having a fixed planar alignment state of a cholesteric liquid crystal having a selective reflection wavelength in a region outside a visible light region (ranging from 380 nm to 780 nm); a layer having a fixed homeotropic alignment state of a rod-like liquid crystal; a layer using columnar alignment or nematic alignment of a discotic liquid crystal; a layer in which a negative uniaxial crystal is aligned in a plane; a layer made of a biaxially aligned polymer film; and others.

As for a C plate, for example, a C plate having a fixed planar alignment state of a cholesteric liquid crystal having a selective reflection wavelength in a region outside the visible light region (ranging from 380 nm to 780 nm) is desirable to have no coloring abnormality in the visible light region with respect to a selective reflection wavelength of a cholesteric liquid crystal. Hence, a necessity arises for a selective reflection light not to be in the visible region. Selective reflection is specially determined by a cholesteric chiral pitch and a refractive index of a liquid crystal. A value of a central wavelength in selective reflection may be in the near infrared region, whereas it is more desirably in an ultraviolet region of 350 nm or less because of an influence of optical rotation exerted or occurrence of a slightly complex phenomenon. Formation of a cholesteric liquid crystal layer is performed in a similar way to that in formation of a cholesteric liquid crystal layer in the reflection polarizer described above.

A C plate having a fixed homeotropic alignment state is made of a liquid crystalline thermoplastic resin showing a nematic liquid crystallinity at a high temperature; a polymerized liquid crystal obtained by polymerizing a liquid crystal monomer and an alignment agent, when required, under illumination with ionizing radiation such as an electron beam, ultraviolet or the like, or with heating; or a mixture thereof. While a liquid crystallinity may be either lyotropic or thermotropic, a thermotropic liquid crystal is desirable from the view point of ease of control and formability of monodomain. A homeotropic orientation is obtained for example in a procedure in which a birefringent material described above is coated on a film made of a vertically aligned film (such as a film of a long chain alkylsilane) and a liquid crystal state is produced and fixed in the film.

As a C plate using a discotic liquid crystal, there is available a plate obtained by producing and fixing a nematic phase or a columnar phase in a discotic liquid crystal material having an optically negative uniaxiality such as a phthalocyanines or a triphenylene compounds each having an in-plane spread molecule as a liquid crystal material. Inorganic layered compounds each with a negative uniaxiality are detailed in a publication of JP-A No. 6-82777 and others.

A C plate using a biaxial alignment of a polymer film can be obtained by one of the following methods, in which a polymer film having positive refractive index anisotropy is biaxially stretched in a good balance; in which a thermoplastic resin is pressed; and in which a C plate is cut off from a parallel aligned crystal.

(Lamination of Layers)

Lamination of each of the layers may be realized only by being laminated on a preceding layer, while it is preferable to laminate the layers with an adhesive agent or a pressure-sensitive adhesive agent from the viewpoint of workability and light utilization efficiency. In that case, it is desirable from the viewpoint of suppressed surface reflection that an adhesive agent or a pressure-sensitive adhesive agent is transparent and does not have absorption in the visible light region, and have refractive indices closest possible to refractive indices of the layers. Preferably used from the view point are an acrylic pressure-sensitive adhesive agent and the like. The following methods can be adopted: one method in which each of the layers forms monodomain with the help of an alignment film separately from the others and sequentially laminated by transfer the layers onto a light transparent base material; and the other in which each of the layers is sequentially formed directly on a preceding layer while forming an alignment film or the like for alignment in a proper manner.

It is possible to further add particles for adjusting diffusibility, when required, to thereby impart isotropic scatterbility, and to properly add an ultraviolet absorbent, an antioxidant, and a surfactant for a purpose to impartation of a leveling property in film formation, in each of the layers and (pressure-sensitive) adhesive layers.

Examples of the method of producing the optical element include, but are not limited to, a method (1) comprising the steps of placing the linear polarization type reflective polarizer (a2) on the light source (D) side and then laminating the retardation layer (b1) and the circular polarization type reflective polarizer (a1) in this order as shown in FIG. 1 or 4 and a method (2) comprising the steps of placing the circular polarization type reflective polarizer (a1) on the light source (D) side and then laminating the retardation layer (b1) and the linear polarization type reflective polarizer (a2) in this order.

In their application to liquid crystal displays, a dichroic linear polarizer (P) may be laminated outside the circular polarization type reflective polarizer (a1) of the optical element.

If the method (2) is used for lamination, the polarization axis of the optical element should be coincided with the polarization axis of the dichroic linear polarizer (P), because the light is linearly polarized light after passing through the optical element. If the method (1) is used for lamination, the dichroic linear polarizer (P) should be placed through a quarter wavelength plate (c) for converting circularly polarized light into linearly polarized light, because the light is circularly polarized light after passing through the optical element. The quarter wavelength plate (c) may be a λ/4 layer similarly to the retardation layer (b12) but preferably has an Nz coefficient of −1.0 to −2.0.

(Condensing Backlight System)

A reflective diffusing plate is preferably placed under a light-guide plate of the light source (on the side opposite to the liquid crystal cell-placing side). The light reflected by the collimating film is mainly composed of obliquely incident components, which are regularly reflected and allowed to return toward the backlight. In this process, if the reflective plate on the back side has high regular reflectivity, the angle of the reflection would be retained so that the light cannot come out in the front direction and be lost. In a preferred mode, therefore, a reflective diffusing plate is placed so that the angle of reflection of the returning reflected light would not be retained and that scattered and reflected components would be increased in the front direction.

An appropriate diffusing plate is preferably placed between the optical element (collimating film) of the invention and the backlight unit (D), so that reflected obliquely-incident light can be scattered near the light guide member of the backlight and part of the light can be scattered toward the vertical incident direction so that the efficiency of reuse of light can be increased. The diffusing plate may be produced by providing rough surface geometry or embedding fine particles of a different refractive index in a resin. The diffusing plate may be sandwiched between the optical element (collimating film) and the backlight or may be adhered to the collimating film.

If a liquid crystal cell adhered to the optical element (collimating film) is placed adjacent to the backlight, Newton's rings could be generated at a space between the surface of the film and the backlight. If the diffusing plate having uneven surface is placed on the light guide-side surface of the optical element (collimating film) of the invention, the generation of such Newton's rings can be controlled. Alternatively, the surface of the optical element (collimating film) of the invention itself may have a layer that forms an uneven structure serving as a light diffusing structure.

(Liquid Crystal Display)

The optical element is preferably used in a liquid crystal display including a liquid crystal cell and polarizing plates placed on both sides of the liquid crystal cell. The optical element may be placed on the polarizing plate side on the light source side with respect to the liquid crystal cell. It should be noted that concerning the components of such a liquid crystal panel, FIGS. 1 to 4 show only the polarizing plate (c) on the light source side.

In the liquid crystal display combined with the collimating backlight, a diffusing plate with no back scattering or depolarization may be laminated on the view side with respect to the liquid crystal cell. In such a case, lights with good display properties in and near the front direction can be diffused so as to produce uniform and good display properties over the entire viewing angles, so that the viewing angle can be magnified.

A viewing angle magnifying film used here is a diffusion plate having substantially no back scattering. A diffusion plate can be provided with a diffusion pressure-sensitive material. An arrangement place thereof can be used above or below a polarizing plate on the viewer side of the liquid crystal display. In order to prevent reduction in contrast due to an influence such as bleeding of pixels or a slightly remaining backscattering, the diffusion plate is desirably provided in a layer at a position closest possible to a cell such as between a polarizing plate and a liquid crystal cell. In this case, it is desirable to use a film that does not substantially cancel polarization. A fine particle distribution type diffusion plate is preferably used, which is disclosed in, for example, the publications of JP-A No. 2000-347006 and JP-A No. 2000-347007.

In a case where a viewing angle magnifying film is placed outside of a polarizing plate, a viewing angle compensating retardation plate may not be used especially if a TN liquid crystal cell is used since collimated lights are transmitted through a liquid crystal layer and through the polarizing plate. If an STN liquid crystal cell is used in the case, it has only to use a retardation film that is well compensated with respect to a front characteristic. Since, in this case, a viewing angle magnifying layer has a surface exposed to air, a type having a refractive effect due to a surface profile can also be employed.

On the other hand, in a case where a viewing angle magnifying film is inserted between a polarizing plate and a liquid crystal layer, light is diffused light at the stage where light is transmitted through the polarizing plate. If a TN liquid crystal is used, a necessity arises for compensating a viewing angle characteristic of the polarizer itself. In this case, it is preferable to insert a retardation plate to compensate a viewing angle characteristic of a polarizing plate between the polarizing plate and the viewing angle magnifying layer. If an STN liquid crystal is used, it is needed to insert a retardation plate to compensate a viewing angle characteristic of the polarizing plate in addition to a front retardation compensation for the STN liquid crystal.

In a case of a viewing angle magnifying film having a regular structure in the interior thereof such as a microlens array or a hologram film, both conventionally having been available, interference has occurred with a fine structure such as a microlens array, a prism array, a louver, a micromirror array or the like that is included in a black matrix of a liquid crystal display or a collimation system of a conventional backlight to thereby cause a moiré pattern with ease. Since in a collimating film in this invention, a regular structure is not visually recognized in a plane thereof and emitted light has no regularity modulation, no necessity arises for consideration of matching with a viewing angle magnifying film or an arrangement sequence. Therefore, a viewing angle magnifying film has a lot of options since no specific limitation is imposed thereon, if neither interference nor a moiré pattern occurs with a pixel black matrix of a liquid crystal display.

In this invention, as viewing angle magnifying films, preferably used are a light scattering plate, having no substantial backscattering and not canceling polarization, which is described in any of the publications of JP-A Nos. 2000-347006 and 2000-347007 and which has a haze in the range of 80% to 90%. Any of layers each of which has a regular structure in the interior thereof such as a hologram sheet, a microprism array, a microlens array or the like can be used, if neither interference nor a moiré pattern occurs with a pixel black matrix of a liquid crystal display.

(Other Materials)

Note that various other kinds of optical layers are properly employed according a common method to thereby, manufacture a liquid crystal display.

A $\lambda/4$ plate in use is a proper retardation plate adapted for a purpose of use. The $\lambda/4$ plate can control an optical characteristic such as a retardation in lamination of two or more kinds of retardation plates. Examples of retardation plates include: birefringent films obtained by stretching films made of proper polymers such as polycarbonate, norbornene resin, polyvinyl alcohol, polystyrene, polymethylmethacrylate, polypropylene, other polyolefins, polyarylate, polyamide and others; alignment films each made of a liquid crystal material such as a liquid crystal polymer; alignment layers each made of a liquid crystal material supported by a film; and others. In general, the $\lambda/4$ plate preferably has a thickness of 0.5 to 200 $\mu m$, particularly preferably of 1 to 100 $\mu m$.

A retardation plate functioning as a $\lambda/4$ plate in a broad wavelength range such as the visible light region can be obtained by a method in which, for example, a retardation layer functioning as a $\lambda/4$ plate for monochromatic light with a wavelength of 550 nm, a retardation layer exhibiting another retardation characteristic, for example a retardation layer functioning as a $½$ wavelength plate are superimposed one on the other, or the like method. Therefore, a retardation plate inserted between a polarizing plate and a brightness enhancement film may be made with one, or two or more retardation layers.

Commonly used is a polarizing plate having a protective film on one side or both sides of a polarizer.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials such as iodine is absorbed and oriented after stretched is suitably used. Although thickness of polarizer is not especially limited, the thickness of about 5 to 80 $\mu m$ is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As the transparent protective film prepared on one side or both sides of the polarizer, materials is excellent in transparency, mechanical strength, heat stability, water shielding property, isotropy, etc. may be preferably used. As materials of the above-mentioned transparent protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned as a. Films made of heat curing type or ultraviolet ray curing type resins, such as acryl based, urethane based, acryl urethane based, epoxy based, and silicone based, etc. may be mentioned as materials of the above-mentioned transparent protective film.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in side chain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protection film, which can be determined arbitrarily, is 500 μm or less, preferably 1 through 300 μm, and especially preferably 5 through 200 μm in viewpoint of strength, work handling and thin layer Moreover, it is preferable that the protective film may have as little coloring as possible. Accordingly, a protective film having a retardation value in a film thickness direction represented by $Rth=[(nx+ny)/2-nz] \times d$ of −90 nm through +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protective film having a retardation value (Rth) of −90 nm through +75 nm in a thickness direction. The retardation value (Rth) in a thickness direction is preferably −80 nm through +60 nm, and especially preferably −70 nm through +45 nm.

As a protective film, if polarization property and durability are taken into consideration, cellulose based polymer, such as triacetyl cellulose, is preferable, and especially triacetyl cellulose film is suitable. In addition, when the protective films are provided on both sides of the polarizer, the protective films comprising same polymer material may be used on both of a front side and a back side, and the protective films comprising different polymer materials etc. may be used. Adhesives are used for adhesion processing of the above described polarizer and the protective film. As adhesives, isocyanate derived adhesives, polyvinyl alcohol derived adhesives, gelatin derived adhesives, vinyl polymers derived latex type, aqueous polyurethane based adhesives, aqueous polyesters derived adhesives, etc. may be mentioned.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the transparent protective film.

A retardation plate is laminated on a polarizing plate as a viewing angle compensating film and used as a wide viewing angle polarizing plate. A viewing angle compensating film is a film for magnifying a viewing angle so as to enable an image to be viewed with relatively sharpness even in a case where a screen image of a liquid crystal display is viewed not in a direction normal to the screen but in a slightly oblique direction relative to the screen.

As such viewing angle compensating retardation plates, there are available, in addition thereto, a film having a birefringence obtained by a biaxially stretching treatment, a stretching treatment in two directions perpendicular to each other or the like and a biaxially stretched film such as an inclined alignment film. As inclined alignment film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

No specific limitation is, in addition to the above described condition, imposed on optical layers laminated when being actually used and there can be used one, or two or more optical layers that have an opportunity to be used in formation of a liquid crystal display and others, such as a reflection plate and a transflective plate. Examples thereof especially include: a reflection type polarizing plate and a transflective type polarizing plate obtained by laminating a reflection plate and a transflective plate, respectively, on an elliptic polarizing plate or a circular polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a transflective type elliptically polarizing plate, etc. in which the above-mentioned reflection type polarizing plate or a transflective type polarizing plate is combined with above described retardation plate respectively.

The above elliptically polarizing plate or the reflective elliptically polarizing plate is a laminate of a polarizing plate or a reflective polarizing plate and an appropriately combined retardation plate. The elliptically polarizing plate or the like may be formed by sequentially laminating the (reflective) polarizing plate and the retardation plate in the desired combination in the process of manufacturing a liquid crystal display. However, an optical film of a pre-laminate serving as an elliptically polarizing plate or the like has good quality stability and good workability for lamination and has the advantage that it can increase the manufacturing efficiency of liquid crystal displays or the like.

A pressure-sensitive adhesive layer or an adhesive layer can also be provided in an optical element of this invention. A pressure-sensitive layer can be used for adherence to a liquid crystal cell and in addition, is used in lamination of optical layers. In adherence of the optical film, the optical axis thereof can be set at a proper arrangement angle in adaptation for a retardation characteristic as a target.

In the polarizing plate mentioned above and the optical film in which at least one layer of the polarizing plate is laminated, an adhesive layer may also be prepared for adhesion with other members, such as a liquid crystal cell etc.

As the pressure sensitive adhesive agent or the adhesive agent is not especially limited. For example, polymers such as acrylic type polymers; silicone type polymers; polyesters, polyurethanes, polyamides, polyvinyl ethers, vinyl acetate/vinyl chloride copolymers, modified polyolefines, epoxy type; and rubber type such as fluorine type, natural rubber, synthetic rubber may be suitably selected as a base polymer. Especially, the one which is excellent in optical transparency, showing adhesion characteristics with moderate wettability, cohesiveness and adhesive property and has outstanding weather resistance, heat resistance, etc. may be preferably used.

The pressure sensitive adhesive agent or the adhesive agent adhesive may contain cross-linking agent according to a base polymer. And the adhesive agent adhesive may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

An adhesive agent and a pressure-sensitive adhesive agent each are usually used as an adhesive agent solution of a base polymer or a composition thereof dissolved or dispersed in a solvent at a solid matter concentration of the order in the range of from 10 to 50 wt %. An organic solvent can be properly selected from the group consisting of toluene, ethyl acetate and others; water; or others, so as to be adapted for a kind of an adhesive agent for use.

An adhesive layer and pressure-sensitive adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

EXAMPLES

Description will be given of the present invention showing examples, while this invention is not restricted to the examples shown below.

Note that as to a front retardation, a direction in which an in-plane refractive index is maximized is referred to as X axis, a direction perpendicular to the X axis as Y axis and the thickness direction of a film as Z axis, and refractive indices in the axis directions as nx, ny and nz, respectively; and from the refractive indices nx, ny and nz at 550 nm measured with an automatic birefringence measuring instrument (manufactured by Oji Sceientific Instruments with a trade name of automatic birefringence meter KOBRA21ADH) and a thickness d (nm) of a retardation layer, a front retardation: (nx−ny)×d, and a retardation in the thickness direction: (nx−nz)×d were calculated. Retardation when measured in an inclined state can be measured with the automatic birefringence measuring instrument. Inclination retardation is expressed by a value of (nx−ny)×d when being inclined.

Note that a reflectance spectrum was measured with a spectrophotometer (Instant multiphotometry system MCPD-2000, manufactured by Otsuka Electronics Co., Ltd.) and a reflection wavelength band is defined as a wavelength band having a half value of the maximum reflectance.

Example 1

A cholesteric liquid crystal layer having a selective reflection wavelength band in the range from 410 nm to 830 nm was used as a circular polarization type reflective polarizer (a1). DBEF manufactured by 3M was used as a linear polarization type reflective polarizer (a2).

A photopolymerizable nematic liquid crystal monomer (LC242 manufactured by BASF LTD.), a chiral agent (LC756 manufactured by BASF LTD.), a photoinitiator (Irgacure 907 manufactured by Ciba Specialty Chemicals Co.), and a solvent (toluene) were prepared and mixed to form a coating liquid having a selective reflection wavelength center of 350 nm. The coating liquid was applied to a commercially available PET film with a wire bar so as to provide a post-drying coating thickness of 6 μm, and then the solvent was dried off. Thereafter, the liquid crystal monomer was once heated to its isotropic transition temperature so that the solvent was dried off. The liquid crystal monomer was then gradually cooled to form a layer having a uniform alignment state. The resulting film was exposed to UV so that the alignment state was fixed and a C-plate layer was formed. With respect to light with a wavelength of 550 nm, the retardation of the C-plate was measured to be 2 nm in the front direction and to be 140 nm in a 30°-inclined position. The C-plate was used as a retardation layer (b11). A uniaxially-stretched polycarbonate film with a front retardation of 138 nm and an Nz coefficient of 1.0 was used as a uniaxial retardation layer (b12).

A polarizing plate manufactured by Nitto Denko Corporation (NPF-SEG 1425DU) was used as a dichroic linear polarizer. They were adhered together with a pressure-sensitive adhesive to form a polarizing element. At this time, the transmission axis of the linear polarization type reflective polarizer (a2) and the slow axis of the uniaxial retardation layer (b12) were displaced by 45°.

Example 2

A biaxially-stretched polycarbonate film with a front retardation of 138 nm and an Nz coefficient of −1.2 was used as a quarter wavelength plate (c). The quarter wavelength plate (c) was combined with the members of Example 1 and laminated as shown in FIG. 4 to form a polarizing element. At this time, the transmission axis of the linear polarization type reflective polarizer (a2) and the slow axis of the uniaxial retardation layer (b12) were displaced by 45°.

Example 3

A photopolymerizable nematic liquid crystal monomer (LC242 manufactured by BASF LTD.), a chiral agent (LC756 manufactured by BASF LTD.), a photoinitiator (Irgacure 907 manufactured by Ciba Specialty Chemicals Co.), and a solvent (toluene) were prepared and mixed to form a coating liquid having a selective reflection wavelength center of 350 nm. The coating liquid was applied with a wire bar to a PET film having a thin pre-coating of a lease treatment agent (octadecyltrimethoxysilane) so as to provide a post-drying coating thickness of 3 μm, and then the solvent was dried off. Thereafter, the liquid crystal monomer was once heated to its isotropic transition temperature so that the solvent was dried off. The liquid crystal monomer was then gradually cooled to form a layer having a uniform alignment state. The resulting film was exposed to UV so that the alignment state was fixed and a C-plate layer was formed. With respect to light with a wavelength of 550 nm, the retardation of the C-plate was measured to be 2 nm in the front direction and to be 240 nm in a 30°-inclined position.

A polarizing element as shown in FIG. 4 was prepared by arranging the respective members in the same manner as in Example 2 except that the C-plate was used as the retardation layer (b11).

Example 4

A biaxially-stretched polycarbonate film with a front retardation of 138 nm and an Nz coefficient of 2.2 was used as a retardation layer (b1). Its retardation was measured to be 208 nm in a 30°-inclined position. The retardation layer (b1) was combined with the members of Example 1 and laminated as shown in FIG. 2 to form a polarizing element.

Example 5

A biaxially-stretched polycarbonate film with a front retardation of 138 nm and an Nz coefficient of −1.2 was used as a retardation layer (b1). Its retardation was measured to be 120 nm in a 30°-inclined position. The retardation layer (b1) was combined with the members of Example 1 and laminated as shown in FIG. 2 to form a polarizing element.

Example 6

A cyclohexanone solution of 15% by weight of a polyimide synthesized from 2,2'-bis(3,4-dicarboxyphenyl)hexafluoropropane and 2,2'-bis(trifluoromethyl)-4,4'-diaminobiphenyl was applied to a 50 μm-thick triacetyl cellulose (TAC) film and dried at 100° C. for 10 minutes to form a film with a residual solvent amount of 7% by weight, a thickness of 6 μm, a front retardation of 2 nm and a retardation of 250 nm in a 30°-inclined position. The film was subjected to 10% lengthwise uniaxial stretching at 160° C. together with a TAC film, then separated from the TAC film and used as a retardation layer (b1), which had a front retardation of 140 nm and a retardation of 250 nm in a 30°-inclined position and an NZ coefficient of 2.6. The retardation layer (b1) was combined with the other members of Example 1 and laminated as shown in FIG. 2 to form a polarizing element.

Comparative Example 1

A photopolymerizable nematic liquid crystal monomer (LC242 manufactured by BASF LTD.), a chiral agent (LC756 manufactured by BASF LTD.), a photoinitiator (Irgacure 907 manufactured by Ciba Specialty Chemicals Co.), and a solvent (toluene) were prepared and mixed to form a coating liquid having a selective reflection wavelength center of 350 nm. The coating liquid was applied to a commercially available PET film with a wire bar so as to provide a post-drying coating thickness of 15 μm, and then the solvent was dried off. Thereafter, the liquid crystal monomer was once heated to its isotropic transition temperature so that the solvent was dried off. The liquid crystal monomer was then gradually cooled to form a layer having a uniform alignment state. The resulting film was exposed to UV so that the alignment state was fixed and a C-plate layer was formed. With respect to light with a wavelength of 550 nm, the retardation of the C-plate was measured to be 4 nm in the front direction and to be 390 nm in a 30°-inclined position.

Figure 5:
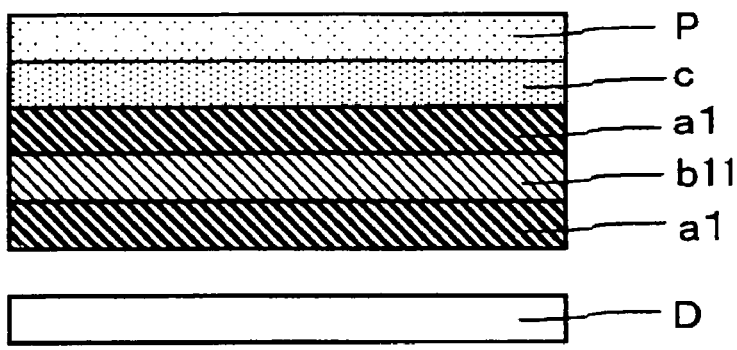
FIG. 5 is a cross-sectional view showing part of a conventional liquid crystal display.

The C-plate was alternatively used as a retardation layer (b11), combined with the members of Examples 1 and 2 and laminated as shown in FIG. 5 to form a polarizing element.

Comparative Example 2

Figure 6:
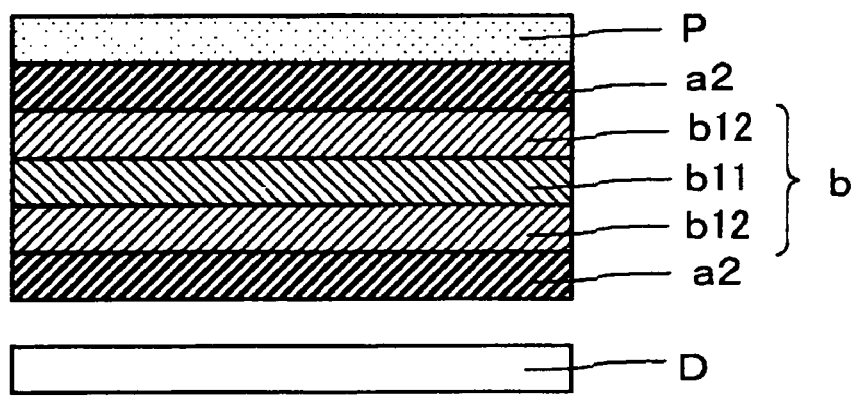
FIG. 6 is a cross-sectional view showing part of a conventional liquid crystal display.
Figure 7:
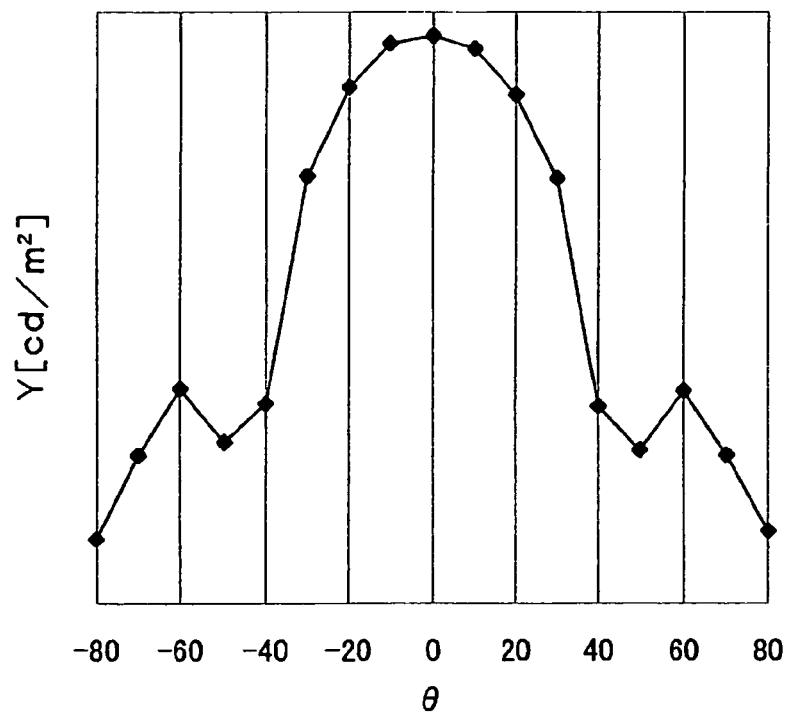
FIG. 7 is a graph showing a viewing angle distribution of brightness in Example 1.
Figure 8:
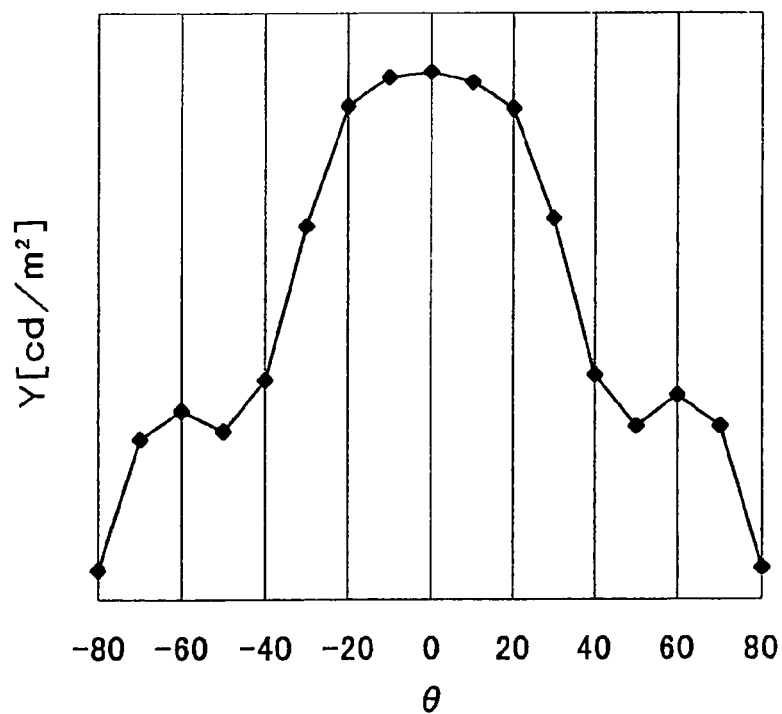
FIG. 8 is a graph showing a viewing angle distribution of brightness in Example 2.
Figure 9:
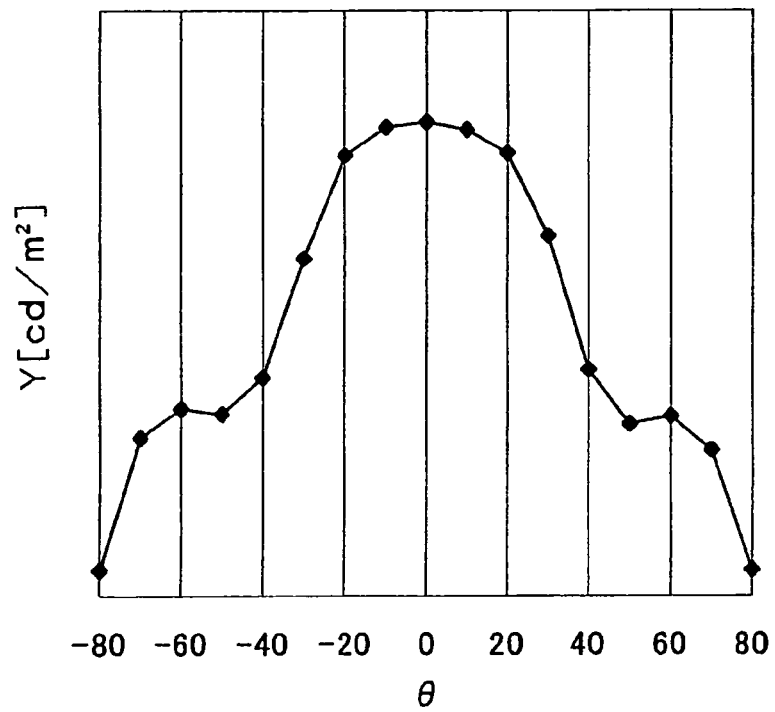
FIG. 9 is a graph showing a viewing angle distribution of brightness in Example 3.
Figure 10:
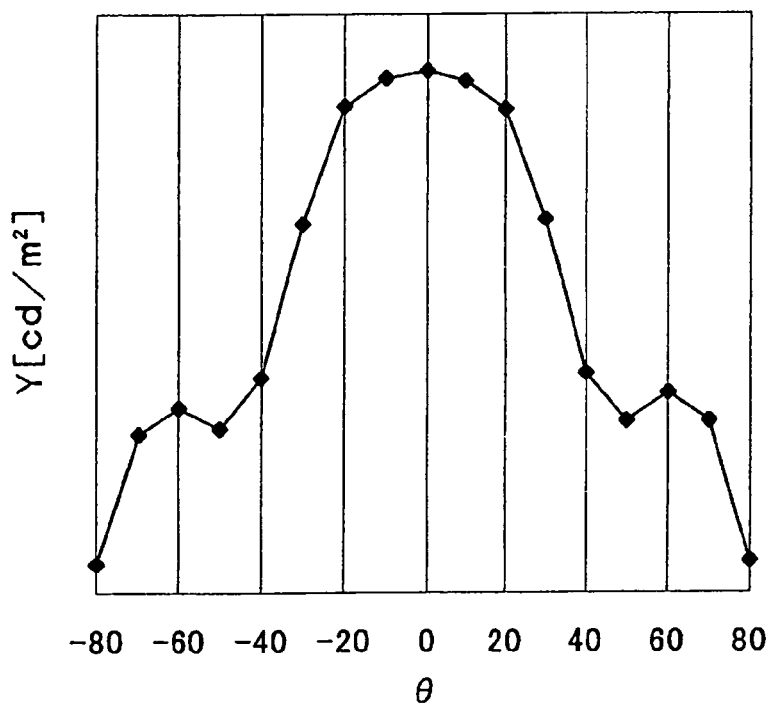
FIG. 10 is a graph showing a viewing angle distribution of brightness in Example 4.
Figure 11:
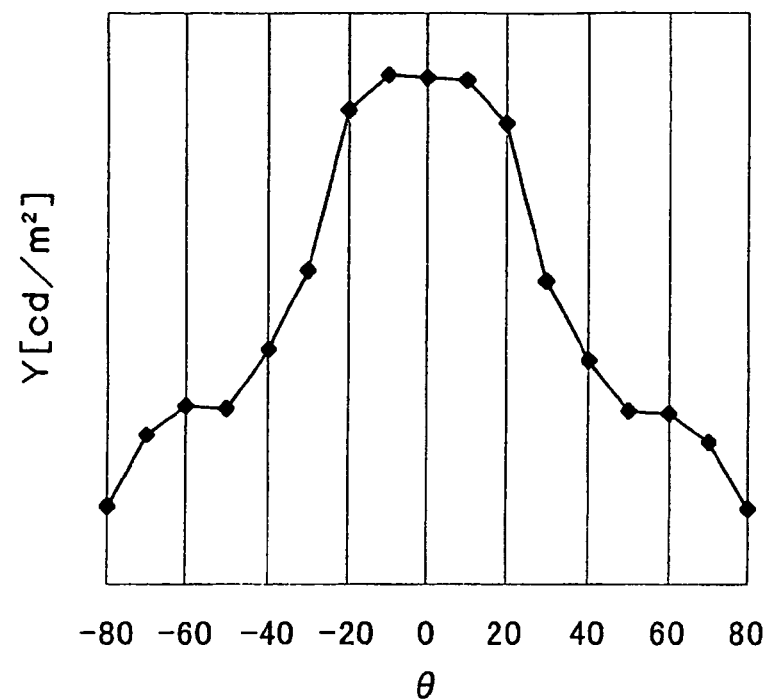
FIG. 11 is a graph showing a viewing angle distribution of brightness in Example 5.
Figure 12:
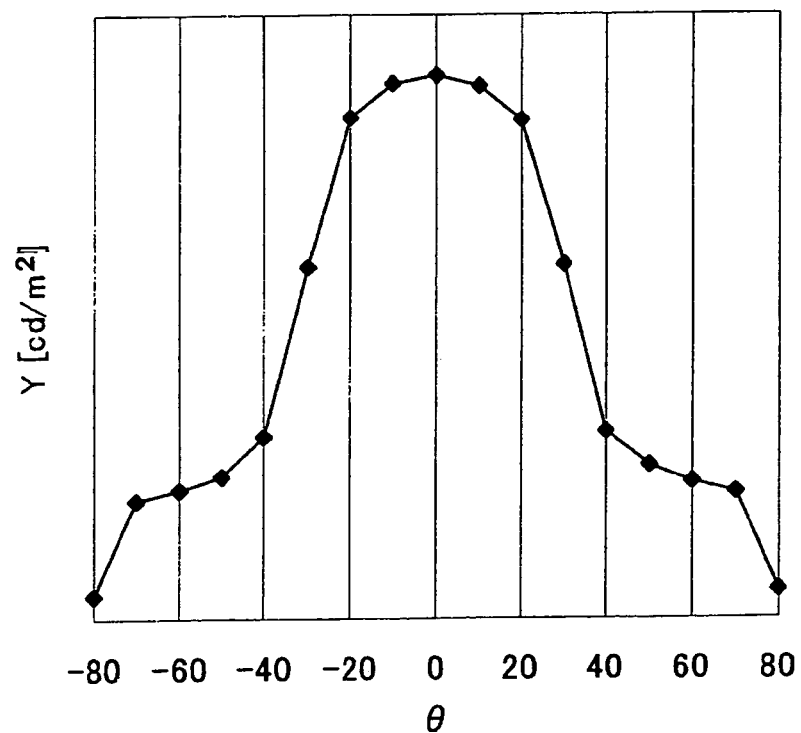
FIG. 12 is a graph showing a viewing angle distribution of brightness in Example 6.
Figure 13:
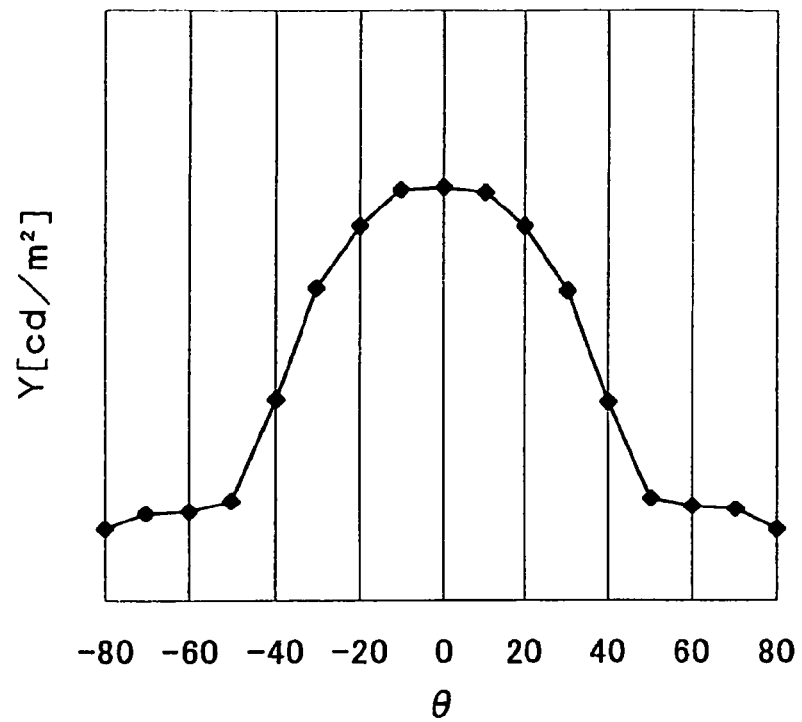
FIG. 13 is a graph showing a viewing angle distribution of brightness in Comparative Example 1.
Figure 14:
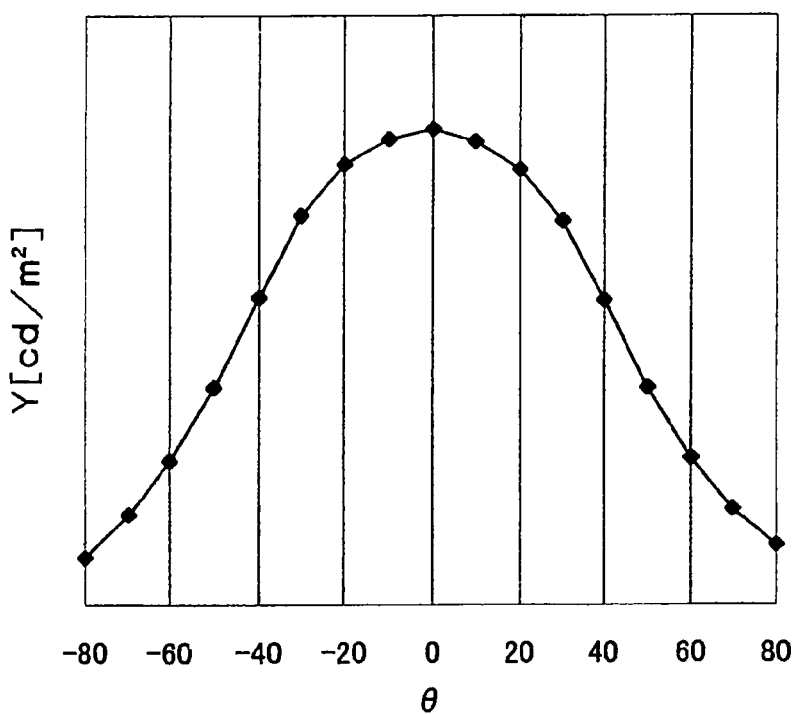
FIG. 14 is a graph showing a viewing angle distribution of brightness in Comparative Example 2.

The members of Example 1 were combined and laminated as shown in FIG. 6 to form a polarizing element.

(Evaluation)

The polarizing element was placed on a commercially available light table (diffuse light source: three band tube). The resulting polarizing element was placed such that the reflective polarizer side faced to the light source side, and the brightness (front brightness) from vertically above and the brightness and the chromaticity in a position inclined to the normal direction were measured with a viewing angle-measuring device EZ-CONTRAST manufactured by ELDIM INC. FIGS. 7 to 14 each show the distribution of brightness with respect to the viewing angle inclined to the normal direction. In the drawings, the horizontal axis θ represents the inclined angle to the normal direction (0°, front), and "−" means the reverse direction for the inclined angle. The vertical axis represents the brightness (relative value). Therefore, the drawings show changes in brightness with the view angle being tilted. If the brightness is high in the normal direction and low in inclined directions, the performance should be high.

Table 1 shows the front brightness and coloring by inclination. The coloring by inclination was evaluated using the criteria below with respect to the value of a difference in chromaticity ($\Delta xy$) which was calculated from the measured front chromaticity ($x_0, y_0$) and the chromaticity ($x_{60}, y_{60}$) measured at an inclined angle of ±60° according to the following formula:

$$\Delta xy = \{(x_0 - x_{60})^2 + (y_0 - y_{60})^2\}^{0.5}$$

○: $\Delta xy$ is less than 0.1.

▲: $\Delta xy$ is at least 0.1 and less than 0.2.

x: $\Delta xy$ is at least 0.2.

TABLE 1

|  | Front Brightness (cd/cm$^2$) | Coloring by Inclined Viewing |
|---|---|---|
| Example 1 | 1157 | ○ |
| Example 2 | 1137 | ○ |
| Example 3 | 1161 | ○ |
| Example 4 | 1145 | ○ |
| Example 5 | 1151 | ○ |
| Example 6 | 1150 | ○ |
| Comparative Example 1 | 1070 | ▲ |
| Comparative Example 2 | 1080 | ▲ |

INDUSTRIAL APPLICABILITY

The optical element using reflective polarizers according to the invention can use diffused light from a light source with a high degree of efficiency, can be applied to polarizing elements and lightning devices, and can form high-brightness polarized-light sources and liquid crystal displays having good visibility.

The invention claimed is:

1. An optical element, comprising:
at least two laminated layers of reflective polarizer; and at least one layer of retardation layer for changing polarization properties laminated between the reflective polarizers,
the combination of the layers being designed so as to provide a incident-light transmittance depending on an incident angle of an incident light and designed such that a shielded light is not absorbed but reflected, wherein
a first layer of the reflective polarizer is a circular polarization type reflective polarizer capable of transmitting a certain circularly polarized light and selectively reflecting an oppositely circularly polarized light;
a second layer of the reflective polarizer is a linear polarization type reflective polarizer capable of transmitting one of perpendicular linearly polarized lights and selectively reflecting the other of the perpendicular linearly polarized lights; and
the retardation layer is a layer having a front in a direction normal to the surface of the retardation layer with a retardation value of about $\lambda/4$ and having a retardation value of at least $\lambda/8$ with respect to an incident light inclined by at least 30° to the normal direction; wherein
the retardation layer is a biaxial retardatin layer having an Nz coefficient of at least 2.0, wherein the Nz coefficient is defined by the formula: $(nx-ny)/(nx-ny)$, where nx and ny are each principal in-plane refractive indices, and nz is a principal refractive index in the thickness direction; and
the biaxial retardation layer has a slow axis whose direction is set to make an angle of 45°±5° or −45°±5° with a polarization of the linear polarization type reflective polarizer.

2. The optical element according to claim 1, wherein the retardation layer (b1) is a stretched film comprising at least one material selected from polycarbonate, polysulfone, polyethylene, polypropylene, polyvinyl alcohol, cycloolefin polymers, and norbornene polymers.

3. The optical element according to claim 1, wherein the retardation layer (b1) is an oriented film comprising at least one material selected from polyamide, polyimide, polyester, polyetherketone, polyamideimide, and polyesterimide.

4. The optical element according to claim 1, wherein the circular polarization type reflective polarizer (a1) comprises a cholesteric liquid crystal material.

5. The optical element according to claim 1, wherein the linear polarization type reflective polarizer (a2) is a grid polarizer.

6. The optical element according to claim 1, wherein the linear polarization type reflective polarizer (a2) is a multilayer thin film laminate comprising at least two layers of at least two materials different in refractive index.

7. The optical element according to claim 6, wherein the multilayer thin film laminate is a vapor-deposited multilayer thin film.

8. The optical element according to claim 1, wherein the linear polarization type reflective polarizer (a2) is a multilayer thin film laminate comprising at least two layers of at least two birefringent materials.

9. The optical element according to claim 8, wherein the multilayer thin film laminate is a stretched resin laminate comprising at least two layers of at least two birefringent resins.

10. A polarizing element, comprising: the optical element according to claim 1; and a dichroic linear polarizer adhered on the outside of the linear polarization type reflective polarizer (a2) of the optical element.

11. A polarizing element, comprising: the optical element according to claim 1; and a quarter wavelength plate and a dichroic linear polarizer which are adhered on the outside of the circular polarization type reflective polarizer (a1) of the optical element.

12. The polarizing element according to claim 11, wherein the quarter wavelength plate has an Nz coefficient of from −2.0 to −1.0, wherein the Nz coefficient is defined by the formula: $(nx-nz)/(nx-ny)$, where nx and ny are each principal in-plane refractive indices, and nz is a principal refractive index in the thickness direction.

13. A lighting device, comprising: a surface light source; a reflective layer provided on the back side of the surface light source; and (i) the optical element according to claim 1, or (ii) a polarizing element comprising the optical element according to claim 1 and a dichroic linear polarizer adhered on the outside of the linear polarization type reflective polarizer (a2) of the optical element, provided on the front side of the surface light source.

14. A liquid crystal display, comprising: the lighting device according to claim 13; and a liquid crystal cell provided on a light-emitting side of the lighting device.

15. A wide viewing angle liquid crystal display, comprising: the liquid crystal display according to claim 14; and a wide viewing angle film that is placed on the view side with respect to the liquid crystal cell in order to diffuse light passing through the liquid crystal cell to the view side.

16. The wide viewing angle liquid crystal display according to claim 15, wherein the wide viewing angle film comprises a diffusing layer exhibiting substantially no back scattering or depolarization.

* * * * *